United States Patent
Nakaya

(10) Patent No.: US 7,085,632 B2
(45) Date of Patent: Aug. 1, 2006

(54) INDIVIDUAL INFORMATION MANAGEMENT SYSTEM

(75) Inventor: Yoshimasa Nakaya, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/775,183

(22) Filed: Feb. 11, 2004

(65) Prior Publication Data

US 2004/0158373 A1  Aug. 12, 2004

(30) Foreign Application Priority Data

Feb. 12, 2003 (JP) .............................. 2003-033972

(51) Int. Cl.
*G01M 17/00* (2006.01)
*G06F 7/00* (2006.01)
*G05D 3/00* (2006.01)

(52) U.S. Cl. ............................ 701/35; 701/33; 701/49; 340/426.13; 340/539.16; 340/539.17

(58) Field of Classification Search ................. 701/35, 701/32, 33, 49; 340/426.13, 539.16, 539.17, 340/539.19
See application file for complete search history.

(56) References Cited

U.S. PATENT DOCUMENTS

| | | | | |
|---|---|---|---|---|
| 6,230,082 | B1 | 5/2001 | Harada et al. | 701/1 |
| 6,759,943 | B1* | 7/2004 | Lucy et al. | 340/5.72 |
| 6,830,123 | B1* | 12/2004 | Ohki et al. | 180/326 |
| 2003/0078709 | A1* | 4/2003 | Yester et al. | 701/36 |
| 2004/0010358 | A1* | 1/2004 | Oesterling et al. | 701/49 |
| 2004/0019416 | A1* | 1/2004 | Chen et al. | 701/36 |

FOREIGN PATENT DOCUMENTS

| | | |
|---|---|---|
| JP | A-S62-94443 | 4/1987 |
| JP | A-S63-146625 | 6/1988 |
| JP | A-H02-224425 | 9/1990 |
| JP | A-H09-284409 | 10/1997 |
| JP | A-H11-134529 | 5/1999 |

* cited by examiner

*Primary Examiner*—Thomas G. Black
*Assistant Examiner*—Brian J. Broadhead
(74) *Attorney, Agent, or Firm*—Posz Law Group, PLC

(57) ABSTRACT

Of a vehicle, a steering position, a seat position, and mirror angles are registered as setting data along with an ID code of the vehicle with a data center. When a user of the vehicle uses the vehicle, the steering position, seat position, and mirror angles are varied based on the setting data that is sent from the data center to the vehicle. This eliminates procedures for setting the devices by trial and error each time the user uses the vehicle.

11 Claims, 8 Drawing Sheets

FIG. 1
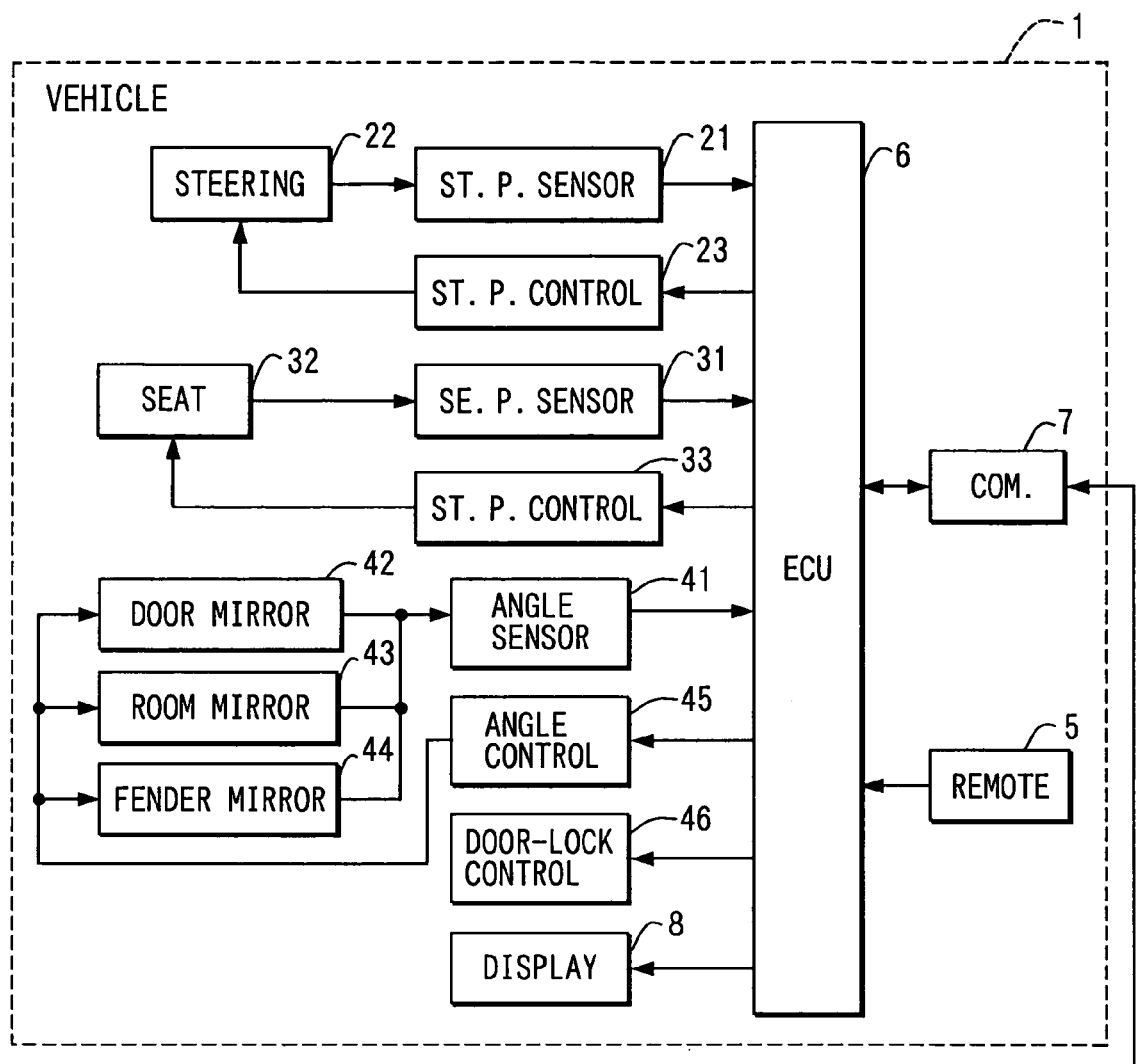
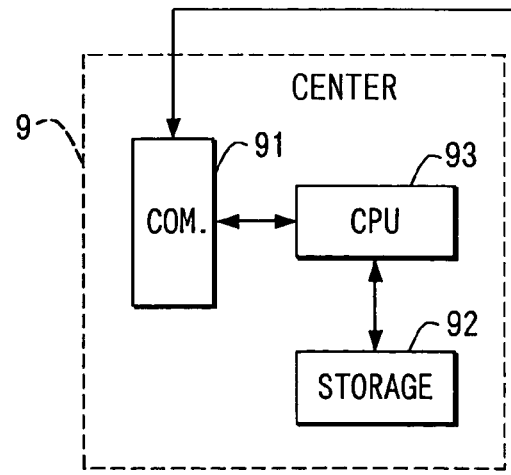

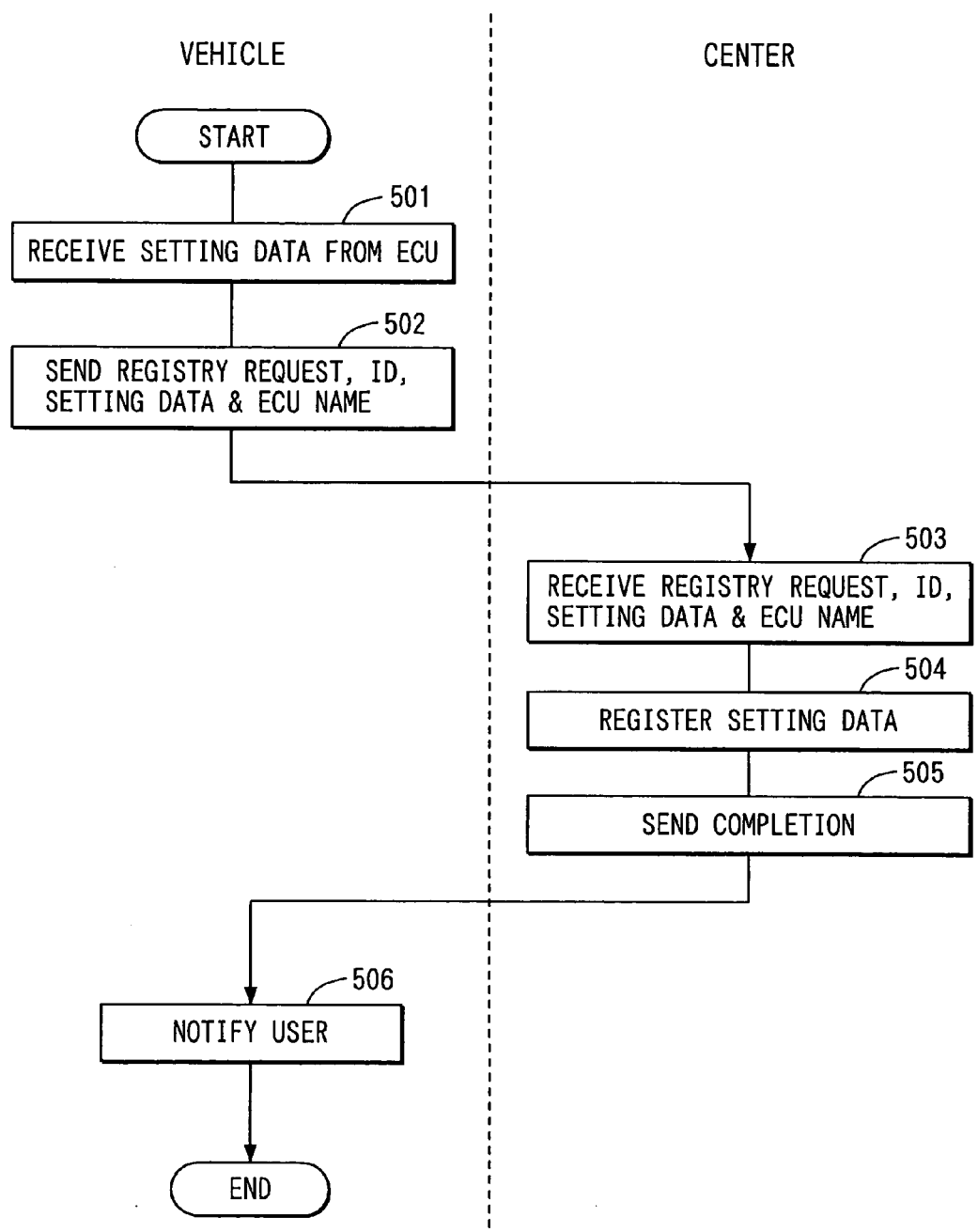

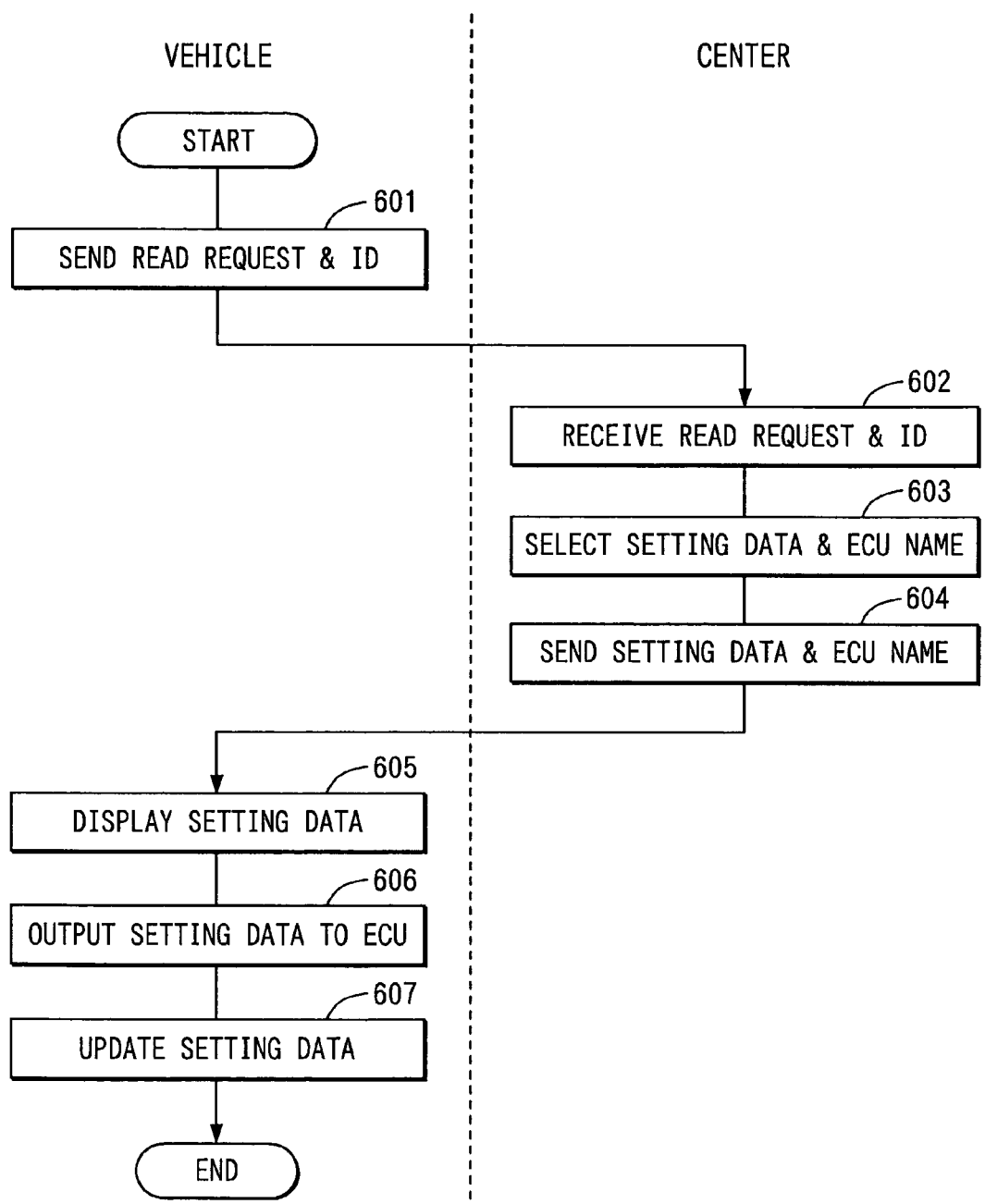

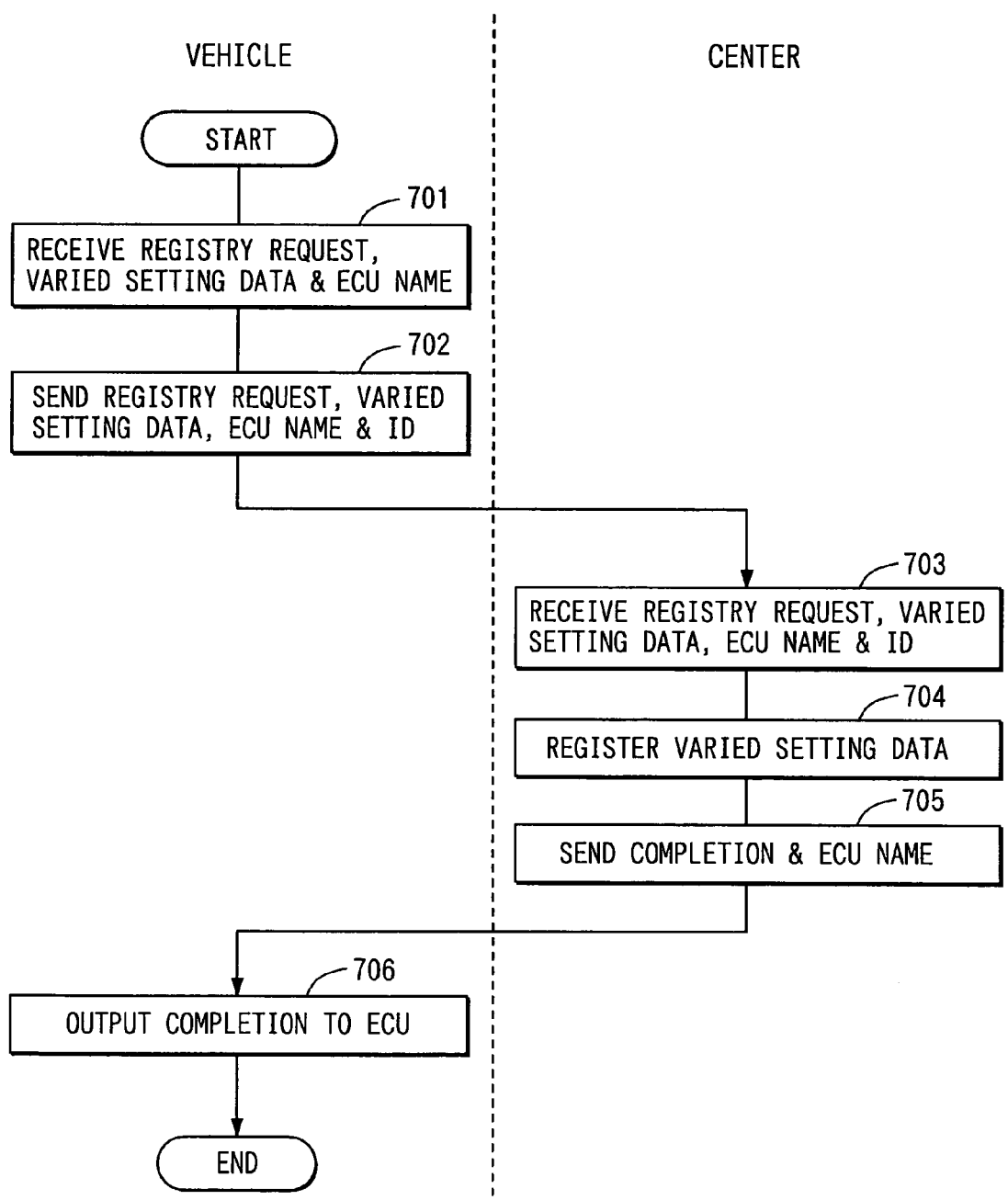

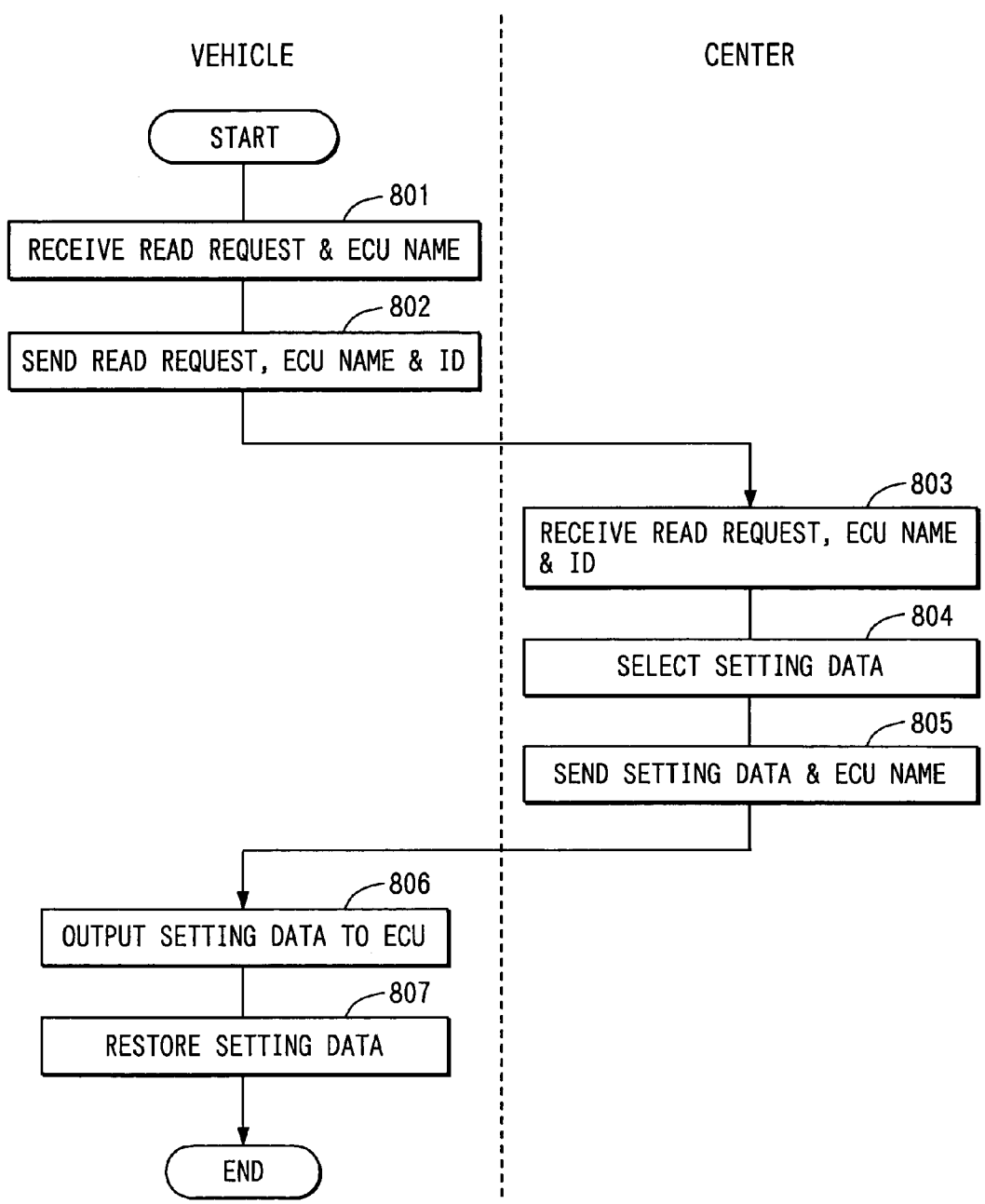

US 7,085,632 B2

INDIVIDUAL INFORMATION MANAGEMENT SYSTEM

CROSS REFERENCE TO RELATED APPLICATIONS

This application is based on and incorporates herein by reference Japanese Patent Application No. 2003-33972 filed on Feb. 12, 2003.

FIELD OF THE INVENTION

The present invention relates to an individual information management system that centralizes in a data center individual information pertinent to devices mounted in vehicles.

BACKGROUND OF THE INVENTION

Along with recent popularization of an automobile, some user possesses his multiple automobiles to use them according to a purpose such as leisure or commute. Also along with a growth of a rent-a-car industry, users tend to use rent-a-cars on business or private trips.

Although the users increase chances of using automobiles, there are few methods where the users can efficiently customize devices mounted in a vehicle. Therefore, each time the user uses an automobile, the user manages to adjust the setting of the devices by trial and error. Further, when data stored in the devices happen to be damaged or destroyed, it must be restored in a car dealer or repairing shop, involving useless times.

SUMMARY OF THE INVENTION

It is an object of the present invention to provide an individual information management system that centralizes, in a data center, individual information pertinent to devices mounted in individual vehicles.

To achieve the above object, an individual information management system is provided with the following. A vehicle sends to a data center, individual information pertinent to devices mounted in the vehicle and identification information for identifying the vehicle. The data center receives the individual information and identification information sent from the vehicle and stores them.

This structure enables setting of various devices to be executed by referring to data stored in a data center when a user uses a vehicle, eliminating procedure by trial and error for appropriately executing or adjusting the setting of the devices and enhancing the efficiency. Further when data stored in the devices happen to be damaged or destroyed, the data can be restored in a car dealer or repairing shop by referring to the data stored in the data center, enabling prompt restoration of the setting data.

BRIEF DESCRIPTION OF THE DRAWINGS

The above and other objects, features, and advantages of the present invention will become more apparent from the following detailed description made with reference to the accompanying drawings. In the drawings:

FIG. 1 is a block diagram showing an overall structure of an individual vehicle information management system according to a first embodiment of the present invention;

FIG. 5 is a flowchart diagram explaining processing of registering devices' setting data in the individual vehicle information management system according to the second embodiment;

FIG. 6 is a flowchart diagram explaining processing of reading the devices' setting data in the individual vehicle information management system according to the second embodiment;

FIG. 7 is a flowchart diagram explaining processing of registering devices' varied setting data in the individual vehicle information management system according to the second embodiment; and FIG. 8 is a flowchart diagram explaining processing of restoring the devices' setting data in the individual vehicle information management system according to the second embodiment.

DETAILED DESCRIPTION OF THE PREFERRED EMBODIMENTS

First Embodiment

Figure 2:
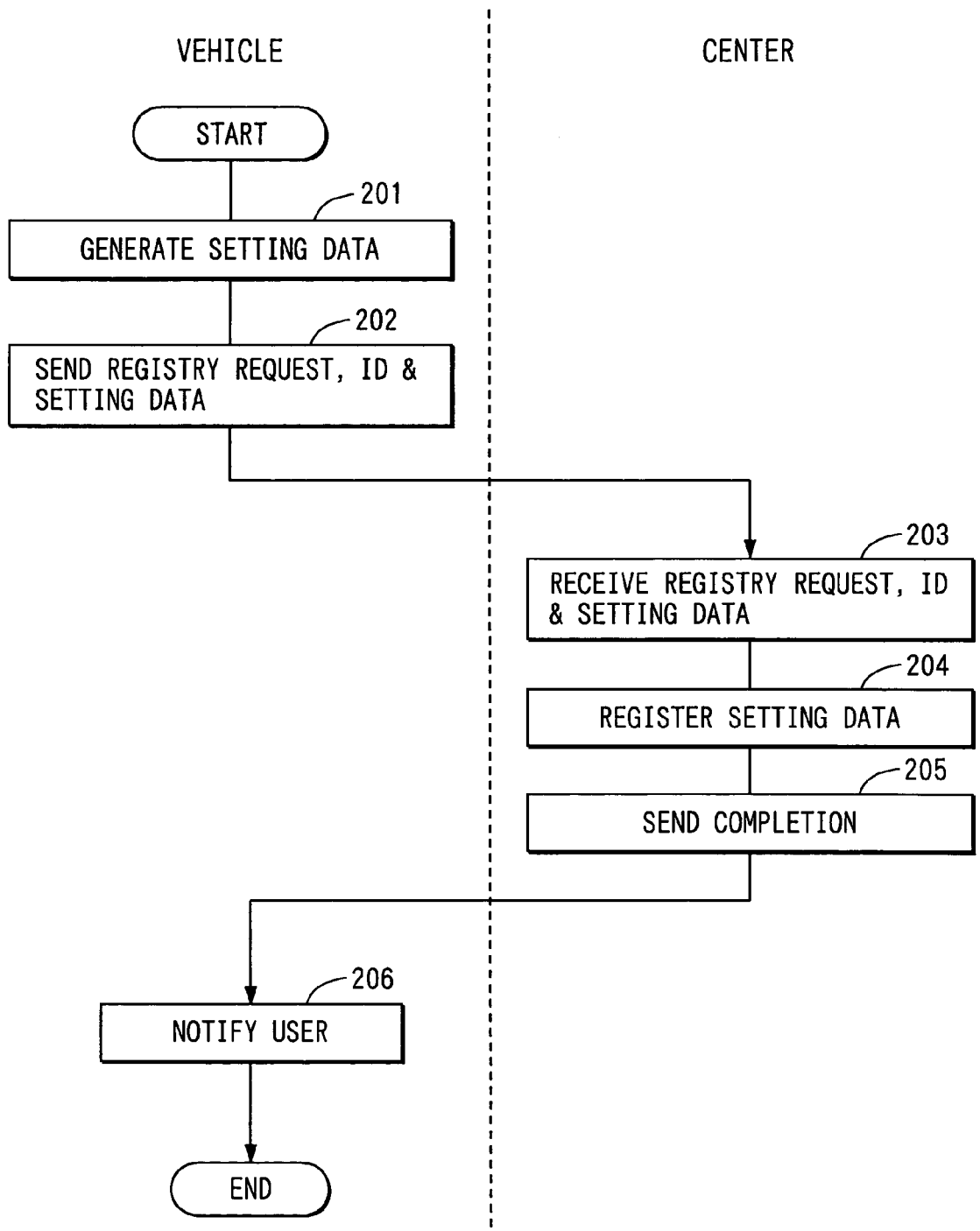
FIG. 2 is a flowchart diagram explaining processing of registering devices' setting data in the individual vehicle information management system according to the first embodiment.

An overall structure of an individual information management system according to a first embodiment of the present invention is shown in FIG. 1. The individual information management system relates to a vehicle 1 and a data center 9.

The vehicle 1 includes various sensors, control units, a remote controller 5, an ECU 6, a communications unit 7, and a display 8.

A steering position sensor 21 is for detecting, as setting information, position differences of a steering 22 in back-forth and up-down orientations on the basis of an initial setting position of the steering 22. A steering position control unit 23 is constructed of a control motor and varies a position of the steering 22 to the back-forth or up-down orientation according to a control signal outputted from the ECU 6.

A seat position sensor 31 is for detecting, as setting information, position differences of a seat 32 in back-forth and up-down orientations on the basis of an initial setting position of the seat 32. A seat position control unit 33 is constructed of a control motor and varies a position of the seat 32 to the back-forth or up-down orientation according to a control signal outputted from the ECU 6.

A mirror angle sensor 41 is for detecting, as setting information, mirror angle differences on the basis of initial setting positions of door mirrors 42, a room mirror 43, or fender mirrors 44. A mirror angle control unit 45 is constructed of a control motor and varies mirror angles of the door mirrors 42, the room mirror 43, or the fender mirrors 44 according to a control signal outputted from the ECU 6.

The remote controller 5 has a setting registry key and a setting read key. The setting registry key is used to command generating setting data (individual information) from setting (setting information) of the steering position, seat position, or mirror angles and then registering them with the data center 9. The setting read key is used to command reading the setting data previously registered with the data center by the user. Commanding registering or reading the setting data can be also executed through a setting registry key or setting read key shown in a touch panel.

The ECU 6 as a requesting means and a varying means is a control ECU to generate setting data from outputs of the steering position sensor 21, seat position sensor 31, and mirror angle sensor 41 and output them to the communications unit 7. The ECU 6 further outputs a read request signal to the communications unit 7. Furthermore, the ECU 6 outputs a control signal to the steering position control unit 23, seat position control unit 33, or mirror angle control unit 45 so that the steering position, seat position, or mirror angles are varied in accordance with the setting data received from the communications unit 7. Yet further, the ECU 6 outputs, to the display 8, contents of the received setting data or a window image notifying a registry completion.

The communications unit 7 as a sending means and receiving means is, for instance, an in-vehicle wireless unit, to send the various signals and data outputted from the ECU 6 to the data center 9. It further outputs the various signals and data outputted from the data center 9 to the ECU 6. The communications method between the vehicle 1 and data center 9 can include a communications method of a navigation system or a cell phone (portable phone or portable device).

The display 8 as a notifying means is, for instance, an in-vehicle liquid crystal display, to display the contents of the setting data or the window image notifying the registry completion outputted from the ECU 6 for notifying the user of it. The method for notifying the user can include a method using a voice via a speaker.

The data center 9 includes a communications unit 91, a storage (or storing unit) 92, and a CPU 93.

The communications unit 91 as a sending or receiving means is, for instance, a wireless base station to receive the various signals or data sent by the vehicle 1 and output it to the CPU 93. The communications unit 91 further sends to the vehicle 1 various signals or data outputted from the CPU 93.

The storage 92 as a storing means is, for instance, constructed of RAID (Redundant Array of Independent) to store the ID code of the vehicle 1 (identification information) and the setting data pertinent to the devices mounted in the vehicle 1. Here, the ID code and setting data are stored as being linked with each other. The ID code and setting data can be stored, for instance, in a DVD-RAM or the like.

The CPU 93 as a selecting means is, for instance, a super computer. The CPU 93 registers the setting data by causing the storage 92 to store it based on the various signals received from the communications unit 91. Further, the CPU 93 reads the setting data stored in the storage 92 to output it to the communications unit 91. These can be executed with parallel distributed processing by connecting multiple workstations via a communications network.

Next, processing of registering setting data of the devices mounted in the vehicle 1 with the data center 9 will be explained with reference to FIG. 2. Processing in the vehicle 1 is shown in the left side of the central dotted line in FIG. 2., while in the data center 9 in the right side. The processing of this flowchart is executed each time a user pushes the setting registry key of the remote controller 5.

At Step 201, the ECU 6 of the vehicle 1 generates setting data by gathering, separately or collectively, outputs from the steering position sensor 21, seat position sensor 31, and mirror angle sensor 41. The steering position, seat position, and mirror angles are set up based on a physical characteristic of a user. Generating the setting data of the devices lessens possibility that the user executes incorrect setting of the devices when the user starts to use the vehicle. This is also useful when the user forgets the setting condition of the devices. Here, other than the steering position, seat position, and mirror angles can be also set up based on the physical characteristic of the user.

At Step 202, the ECU 6 outputs to the communications unit 7 a registry request signal, the ID code of the vehicle 1, and the setting data generated at Step 201 for sending to the data center 9.

At Step 203, the communications unit 91 of the data center 9 receives the registry request signal, ID code of the vehicle 1, and setting data sent from the vehicle 1. At Step 204, as the CPU 93 receives the registry request signal, ID code of the vehicle 1, and setting data sent that are received by the communications unit 91, it registers the setting data by linking and storing the setting data and the ID code of the vehicle 1 in the storage 92. At Step 205, the CPU 93 outputs a registry completion signal to the communications unit 91 for sending it to the vehicle 1.

At Step 206, as the ECU 6 of the vehicle 1 receives the registry completion signal sent from the data center 9 at Step 205, it outputs the registry completion image window to the display 8 for notifying the user of the registry completion of the setting data.

Figure 3:
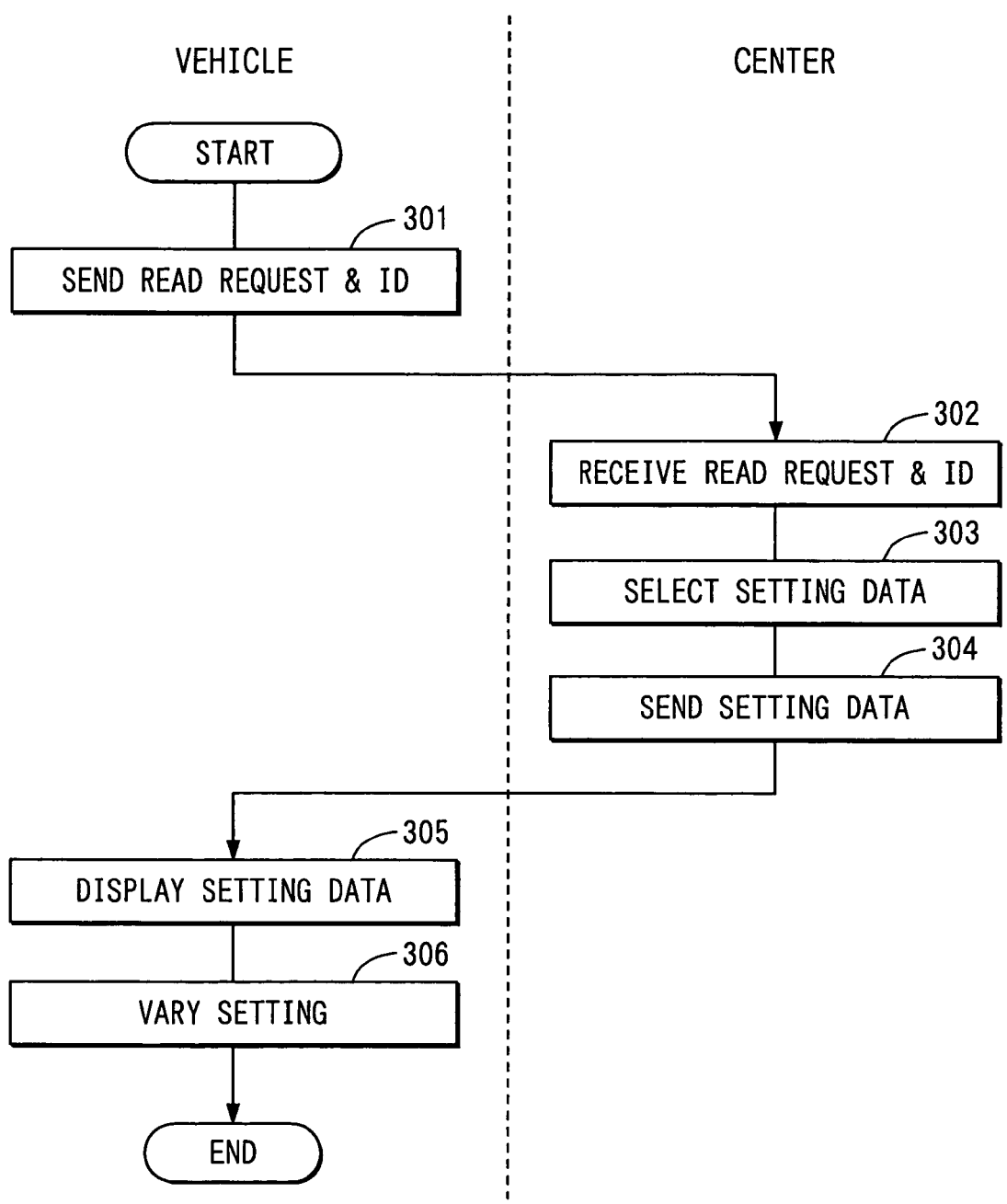
FIG. 3 is a flowchart diagram explaining processing of reading the devices' setting data in the individual vehicle information management system according to the first embodiment.

Next, processing of reading setting data of the devices mounted in the vehicle 1 from the data center 9 will be explained with reference to FIG. 3. Processing in the vehicle 1 is shown in the left side of the central dotted line in FIG. 3, while in the data center 9 in the right side. The processing of this flowchart is executed each time a user pushes the setting read key of the remote controller 5.

At Step 301, the ECU 6 of the vehicle 1 outputs to the communications unit 7 a read request signal and the ID code of the vehicle 1 for sending them to the data center 9.

At Step 302, the communications unit 91 of the data center 9 receives the read request signal and ID code of the vehicle 1 sent from the vehicle 1. At Step 303, the CPU 93 selects from the storage 92 the setting data linking with the ID code of the vehicle 1 received by the communications unit 91. At Step 304, the CPU 93 outputs the setting data selected at Step 303 to the communications unit 91 for sending it to the vehicle 1.

At Step 305, as the ECU 6 of the vehicle 1 receives the setting data sent from the data center 9 at Step 304, it outputs the contents of the setting data to the display 8 for notifying the user of the contents of the setting data. At Step 306, the ECU 6 outputs control signals to the steering position control unit 23, seat position control unit 33, and mirror angle control unit 45 for varying the steering position, seat position, and mirror angles to meet the setting data received at Step 305.

This structure enables the user to directly access from the vehicle 1 to the data center 9 and then refer to the setting data. The setting up of the devices mounted in the vehicle 1 can be automatically executed, enabling securely varying the setting of the devices. This also enables an efficient restoring operation for the damaged setting data in a car dealer or a repairing shop through referring to the setting data stored in the data center 9.

Further, suppose that setting up for the steering, seat, or mirrors can be stepwise performed. For instance, a position can be varied every 5 cm, or an angle can be varied every 10 degrees. Here, the display 8 can show an operational procedure with which the steering position, seat position, or mirror angles can be adjusted for meeting the setting data (e.g., "please push three times the position change key for the steering position control unit"). In this case, the user operates the individual control units by referring to the setting data shown in the display 8.

Thus, in the individual information management system of this embodiment, a steering position, seat position, and mirror angles of a vehicle 1 are stored as setting data in a data center 9. When the user starts to use the vehicle 1, the setting data stored in the data center 9 is read out and the steering position, seat position, and mirror angles are varied to meet the setting data read out from the data center 9.

Conventionally, each time a user uses a vehicle, the user sets up devices mounted in the vehicle by trial and error. Further, when data stored in the devices is damaged owing to a reason of some kind, restoring the data needs to be executed in a car dealer or a repairing shop, which involves numerous times. By contrast, using the individual information management system of the embodiment, the user can set up the devices by referring to the setting data stored in the data center 9 when the user uses the vehicle. This eliminates procedure to find the appropriate setting by trail and error, enhancing the efficiency in setting up the devices. Further, when the damaged data is restored, the car dealer or repairing shop can also refer to the setting data stored in the data center, enabling prompt restoring.

Furthermore, in the individual information management system of the embodiment, the setting data can include an identification code stored in a door-lock control unit 46 in the vehicle 1. The door-lock control unit 46 is for controlling opening and closing of a door-lock of the vehicle 1 when the door-lock control unit 46 receives an identification code of a portable electronic key held by the user. Including the identification code in the setting data enables the identification code to be restored by referring to the setting data stored in the data center 9 even when the identification code stored in the door-lock control unit is mistakenly destroyed.

Second Embodiment

Figure 4:
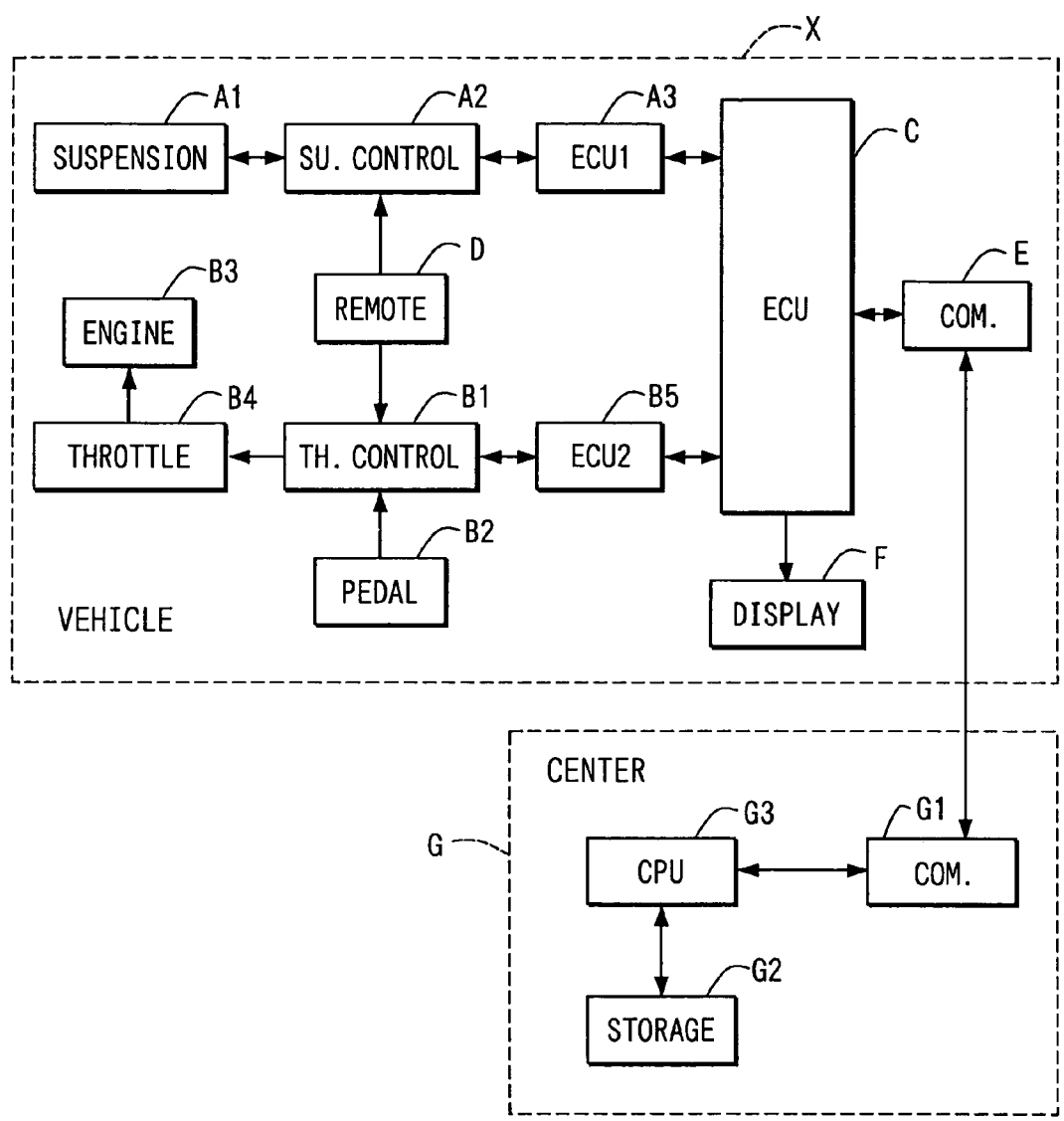
FIG. 4 is a block diagram showing an overall structure of an individual vehicle information management system according to a second embodiment of the present invention.

An overall structure of an individual information management system according to a second embodiment of the present invention is shown in FIG. 4. The individual information management system relates to a vehicle X and a data center G.

The vehicle X includes a suspension A1, a suspension control unit A2, an individual information variation ECU 1 (IIV-ECU 1) A3, a throttle control unit B1, an accelerator pedal B2, an engine B3, a throttle B4, an individual information variation ECU 2 (IIV-ECU 2) B5, a collection ECU (C-ECU) C, a remote controller D, a communications unit E, and a display F.

The suspension A1 is for absorbing vibration or shock while the vehicle X is traveling on a road. In particular, with respect to this suspension A1 of the second embodiment, adjustment information can be varied regardless of traveling states of the vehicle X, the adjustment information which includes a strength of a spring and a characteristic of a shock absorber. This can vary a traveling characteristic of the vehicle X.

The suspension control unit A2 is for detecting the strength of the spring or the characteristic of the shock absorber to output them as setting information to the IIV-ECU 1 A3. Further, the suspension control unit A2 varies, of the suspension A1, the strength of the spring or the characteristic of the shock absorber based on the setting data received from the IIV-ECU 1 A3. It can also vary the strength of the spring or the characteristic of the shock absorber based on commands (instructions) of the remote controller D.

The individual information variation ECU 1 (IIV-ECU 1) A3 outputs setting data received from the C-ECU C to the suspension control unit A2. The IIV-ECU 1 A3 further outputs the setting data received from the suspension control unit A2 along with an own name of the IIV-ECU 1 A3 to the C-ECU C.

Furthermore, the IIV-ECU 1 A3 constantly monitors the setting data stored in the suspension control unit A2. When the setting data is determined to be damaged, the IIV-ECU 1 A3 then outputs a read request signal along with the own name of the IIV-ECU 1 A3 to the C-ECU C. Determining the damage of the setting data is performed using a parity check method, a CRC method, or the like. These methods are well-known technology, so that explanation will be eliminated. Further, when varying of the setting data is determined, the varied setting data is outputted along with a registry request signal and the name of the IIV-ECU 1 A3 to the C-ECU C.

The throttle control B1 is for varying an opening degree of the throttle B4 controlling a fuel injected within the engine B3 according to a stepping degree of the accelerator pedal B2 of the vehicle X. In particular, with respect to this throttle control unit B1 of the second embodiment, multiple corresponding relation patterns indicating a corresponding relation between a stepping degree of the accelerator pedal B2 and an opening degree of the throttle B4 are previously prepared. By changing the corresponding relation pattern, a driving characteristic of the engine B3 can be varied, resulting in variation of a starting characteristic or accelerating characteristic. Namely, each of the multiple corresponding relation patterns is included in the setting data. The corresponding relation pattern can be changed by the setting data received from the C-ECU C or by an instruction from the remote controller D.

The individual information variation ECU 2 (IIV-ECU 2) B5 outputs the setting data received from the C-ECU C to the throttle control unit B1. The IIV-ECU 2 B5 further receives the setting data from the throttle control unit B1 to output it along with an own name of the IIV-ECU 2 B5 to the C-ECU C.

Furthermore, the IIV-ECU 2 B5 constantly monitors the setting data stored in the throttle control unit B1. When the setting data is determined to be damaged, the IIV-ECU 2 B5 then outputs a read request signal along with the own name of the IIV-ECU 2 B5 to the C-ECU C. Determining the damage of the setting data is performed using a parity check method, a CRC method, or the like. These methods are well-known technology, so that explanation will be eliminated. Further, when varying of the setting data is determined, the varied setting data is outputted along with a registry request signal and the name of the IIV-ECU 2 B5 to the C-ECU C.

The C-ECU C outputs various signals and data outputted from the IIV-ECU 1 A3 or IIV-ECU 2 B5 along with the ID code of the vehicle X to the communications unit E. It further outputs the various signals and data received by the communications unit E to the IIV-ECU 1 A3 or IIV-ECU 2 B5. Here, the contents of the setting data are outputted to the display F.

The remote controller D has a setting registry key and a setting read key. The setting registry key is used to register the setting data with the data center G. The setting read key is used to command reading the setting data previously registered with the data center G by the user. The remote controller D also commands varying of the spring strength and shock absorber characteristic of the suspension A1 or varying of the corresponding relation pattern between the stepping degree of the accelerator pedal B2 and opening degree of the throttle B4.

The communications unit E sends the various signals and data outputted from the C-ECU C to the data center G. It further outputs the various signals and data sent from the data center G to the C-ECU C.

The display F displays the contents of the setting data or window image notifying the registry completion outputted from the C-ECU C for notifying the user of it.

The data center G includes a communications unit G1, a storage G2, and a CPU G3.

The communications unit G1 receives the various signals or data sent by the vehicle X and outputs it to the CPU G3. It further sends the various signals or data outputted from the CPU G3 to the vehicle X.

The storage G2 stores as follows: the ID code of the vehicle X; the setting data pertinent to the devices mounted in the vehicle X; and a name of an individual information variation ECU (IIV-ECU) managing the corresponding setting data. Here, the ID code, setting data, and the name of the IIV-ECU are stored as being linked mutually.

The CPU G3 receives the various signals, the ID code of the vehicle X, the setting data for the various devices mounted in the vehicle X, the name of the IIV-ECU managing the corresponding setting data, from the communications unit G1. The CPU G3 then registers the setting data linked with the ID code of the vehicle X and name of the IIV-ECU by causing the storage G2 to store them. The CPU G3 reads the registered setting data linked with the ID code of the vehicle X and name of the IIV-ECU from the storage G2 to output the setting data along with the name of the corresponding IIV-ECU to the communications unit G1.

Next, processing of registering setting data of the devices mounted in the vehicle X with the data center G will be explained with reference to FIG. 5. Processing in the vehicle X is shown in the left side of the central dotted line in FIG. 5, while in the data center G in the right side. The processing of this flowchart is executed each time a user pushes the setting registry key of the remote controller D.

At Step 501, the collection ECU C (C-ECU C) of the vehicle X receives the setting data of the suspension control unit A2 or throttle control unit B5 from the IIV-ECU 1 A3 or IIV-ECU 2 B5, respectively. The suspension A1 and corresponding relation pattern between the accelerator pedal and throttle opening are set up based on preference of a user each time the user uses the vehicle X. Registering the setting data of the suspension control unit A2 or throttle control unit B1 with the data center G enables automatic setting meeting the preference of the user each time the user uses the vehicle X.

At Step 502, the C-ECU C outputs to the communications unit E a registry request signal, the ID code of the vehicle X, and the setting data and name of the IIV-ECU received at Step 501 for sending them to the data center G.

At Step 503, the communications unit G1 of the data center G receives the registry request, ID code of the vehicle X, and setting data and name of the IIV-ECU sent from the vehicle X at Step 502.

At Step 504, as the CPU G3 receives the registry request signal, ID code of the vehicle X, and setting data and name of the IIV-ECU that are received by the communications unit G1 at Step 503, it registers the setting data by storing it being linked with the ID code of the vehicle X and the name of the IIV-ECU in the storage G2. At Step 505, the CPU G3 outputs a registry completion signal to the communications unit G1 for sending it to the vehicle X.

At Step 506, as the C-ECU C of the vehicle X receives the registry completion signal sent from the data center G at Step 505, it outputs the registry completion image window to the display F for notifying the user of the registry completion of the setting data.

Next, processing of reading setting data of the devices mounted in the vehicle X from the data center G will be explained with reference to FIG. 6. Processing in the vehicle X is shown in the left side of the central dotted line in FIG. 6, while in the data center G in the right side. The processing of this flowchart is executed each time a user pushes the setting read key of the remote controller D.

At Step 601, the C-ECU C of the vehicle X outputs to the communications unit E a read request signal and the ID code of the vehicle X for sending them to the data center G.

At Step 602, the communications unit G1 of the data center G receives the read request signal and ID code of the vehicle X sent from the vehicle X. At Step 603, the CPU G3 selects from the storage G2 the setting data and name of the corresponding IIV-ECU linking with the ID code of the vehicle X received by the communications unit G1 at Step 602. At Step 604, the CPU G3 outputs the setting data and name of the corresponding IIV-ECU selected at Step 603 to the communications unit G1 for sending them to the vehicle X.

At Step 605, as the C-ECU C of the vehicle X receives the setting data and name of the corresponding IIV-ECU sent from the data center G at Step 604, it outputs the contents of the setting data to the display F for notifying the user of the contents of the setting data. At Step 606, the C-ECU C outputs the setting data to the corresponding IIV-ECU. At Step 607, the individual IIV-ECU outputs the setting data received from the C-ECU C to the corresponding control unit to vary the setting data. Thereby, the suspension control unit A2 varies, of the suspension A1, the strength of the spring or the characteristic of the shock absorber based on the setting data received from the IIV-ECU 1 A3. By contrast, the throttle control B1 varies the corresponding relation patterns between the stepping degree of the accelerator pedal B2 and opening degree of the throttle B4 into the pattern indicated by the setting data received from the IIV-ECU 2 B5.

Next, processing of registering varied setting data of the devices mounted in the vehicle X with the data center G will be explained with reference to FIG. 7. Here, the setting data is varied by the user. Processing in the vehicle X is shown in the left side of the central dotted line in FIG. 7, while in the data center G in the right side. The processing of this flowchart is executed each time the user commands, using the remote controller D, varying the spring strength or shock absorber characteristic or varying the corresponding relation pattern between the stepping degree of the accelerator pedal B2 and opening degree of the throttle B4.

At Step 701, the collection ECU C (C-ECU C) of the vehicle X receives, from a corresponding individual information variation ECU (IIV-ECU) managing a control unit that is instructed to vary the setting data, a registry request signal, varied setting data (posterior to varying of the setting), and a name of the corresponding IIV-ECU.

At Step 702, the C-ECU C outputs to the communications unit E the registry request signal, varied setting data, and name of the IIV-ECU received at Step 701 along with the ID code of the vehicle X for sending them to the data center G.

At Step 703, the communications unit G1 of the data center G receives the registry request signal, varied setting data, name of the IIV-ECU, and the ID code of the vehicle X sent from the vehicle X at Step 702.

At Step 704, as the CPU G3 receives the registry request signal, varied setting data, name of the IIV-ECU, and the ID code of the vehicle X sent from the vehicle X that are received by the communications unit G1 at Step 703, it stores the setting data being linked with the ID code of the vehicle X and the name of the IIV-ECU in the storage G2. The CPU G3 then registers only the varied setting data managed by the corresponding IIV-ECU. At Step 705, the CPU G3 outputs a registry completion signal and the name of the corresponding IIV-ECU to the communications unit G1 for sending them to the vehicle X.

At Step 706, as the C-ECU C of the vehicle X receives the registry completion signal and name of the corresponding IIV-ECU sent from the data center G at Step 705, it outputs the registry completion signal to the corresponding IIV-ECU having the name that is received, then terminating the processing. This structure enables the data center G to store the latest setting data of the devices mounted in the vehicle X.

Next, processing of restoring damaged setting data of the devices mounted in the vehicle X using the data center G will be explained with reference to FIG. 8. Processing in the vehicle X is shown in the left side of the central dotted line in FIG. 8, while in the data center G in the right side. The processing of this flowchart is executed each time the IIV-ECU 1 A3 or IIV-ECU 2 B5 determines that the setting data is damaged.

At Step 801, the C-ECU C of the vehicle X receives a read request signal and a name of the corresponding IIV-ECU outputted from the corresponding IIV-ECU that determines that the setting data is damaged. At Step 802, the C-ECU C outputs to the communications unit E the read request signal, name of the corresponding IIV-ECU, and the ID code of the vehicle X for sending them to the data center G.

At Step 803, the communications unit G1 of the data center G receives the read request signal, name of the corresponding IIV-ECU, and ID code of the vehicle X sent from the vehicle X. At Step 804, the CPU G3 then receives the read request signal, name of the corresponding IIV-ECU, and ID code of the vehicle X sent from the vehicle X and selects the setting data linked with the ID code of the vehicle X and name of the corresponding IIV-ECU from the storage G2. At Step 805, the CPU G3 outputs the setting data and name of the corresponding IIV-ECU selected at Step 804 to the communications unit G1 for sending them to the vehicle X.

At Step 806, as the C-ECU C of the vehicle X receives the setting data and name of the corresponding IIV-ECU sent from the data center G at Step 805, it outputs the setting data to the corresponding IIV-ECU having the name that is received. At Step 807, the individual IIV-ECU that determined that the setting data is damaged, restores the damaged setting data using the setting data outputted from the C-ECU C.

As explained above, in the individual information management system of the second embodiment, setting data is executed based on preference of a user. Here, the setting data includes a spring strength or shock absorber characteristic of the suspension A1, and a corresponding relation pattern between a stepping degree of the accelerator pedal B2 and an opening degree of the throttle B4. When the user varies the setting, the varied setting data is automatically registered with the data center G. Further, when the setting data is damaged owing to a reason of some kind, the setting data is automatically read from the data center G to be used for restoring. This eliminates necessity of the user for intentionally commanding registering or restoring the setting data.

The processings or functions within the above mentioned individual information management systems of the first and second embodiments can be also used separately, collectively or in combination of some of them.

Furthermore, the individual information management system can be appropriately applied to applications of a rent-a-car. Here, a user reads, for instance, from a communications unit of a rent-a-car company, stored setting data linked with an ID code of a user's own vehicle. The user then varies the setting of devices of a rent-a-car by inputting the received setting data to the rent-a-car.

It will be obvious to those skilled in the art that various changes may be made in the above-described embodiments of the present invention. However, the scope of the present invention should be determined by the following claims.

What is claimed is:

1. An individual information management system relating to a vehicle and a data center, comprising:

vehicle sending means provided in the vehicle for sending, to the data center, (i) individual information that is pertinent to devices mounted in the vehicle and includes setting information corresponding to the devices and (ii) identification information for identifying the vehicle;

center receiving means provided in the data center for receiving the individual information and the identification information, both of which are sent by the vehicle sending means;

center storing means provided in the data center for storing the individual information and the identification information, both of which are received by the center receiving means;

vehicle requesting means provided in the vehicle for outputting a request for the data center to send the individual information that is stored in the center storing means and that corresponds to the identification information that accompanies the request;

center selecting means provided in the data center for selecting the individual information stored by the center storing means based on the identification information accompanying the request;

center sending means provided in the data center for sending, to the vehicle, the individual information selected by the center selecting means;

vehicle receiving means provided in the vehicle for receiving the individual information sent by the center sending means; and vehicle varying means provided in the vehicle for varying settings of the devices based on the setting information included in the individual information that corresponds to the request outputted by the vehicle requesting means and then received by the vehicle receiving means, wherein, each time the individual information in the vehicle is determined to be damaged, the vehicle requesting means outputs the request, which is accompanied by the identification information, for the data center to send an individual information stored in the center storing means and corresponds to the identification information, then the center selecting means selects the individual information stored by the center storing means responsive to the identification information accompanying the request, then the center sending means sends, to the vehicle receiving means, the individual information selected by the center selecting means, and then the vehicle varying means automatically restores the damaged individual information using the individual information that is received by the vehicle receiving means, wherein the individual information is determined to be damaged responsive to at least one of a CRC method and a parity check.

2. The individual information management system of claim 1, further comprising:

vehicle notifying means provided in the vehicle for notifying the identification information received by the vehicle receiving means to a user of the vehicle.

3. The individual information management system of claim 1, wherein the vehicle sending means sends, to the data center, the individual information each time the setting of the devices is varied.

4. The individual information management system of claim 3, further comprising:

vehicle controlling means provided in the vehicle for controlling states of a door-lock of the vehicle when a given identification code is received from a unit held by a user of the vehicle, wherein the setting information includes the given identification code.

5. The individual information management system of claim 3, wherein the setting information includes setting information for a given device whose setting is set based on a physical characteristic of a user of the vehicle.

6. The individual information management system of claim 5, wherein the setting information for the given device includes position information of a steering of the vehicle.

7. The individual information management system of claim 5, wherein the setting information for the given device includes position information of a seat of the vehicle.

8. The individual information management system of claim 5, wherein the setting information for the given device includes angle information of at least one of a room mirror, a fender mirror, and a door mirror of the vehicle.

9. The individual information management system of claim 3, wherein the setting information includes setting information for a certain device whose setting is set based on a preference of a user of the vehicle.

10. The individual information management system of claim 9, wherein the setting information for the certain device includes adjustment information of a suspension of the vehicle.

11. The individual information management system of claim 9, wherein the setting information for the certain device includes driving characteristic information of an engine of the vehicle.

* * * * *